United States Patent
Ward

(10) Patent No.: US 12,043,471 B2
(45) Date of Patent: Jul. 23, 2024

(54) TRANSPARENT BEVERAGE CONTAINER INSULATOR

(71) Applicant: Scott Ward, Roswell, GA (US)

(72) Inventor: Scott Ward, Roswell, GA (US)

( * ) Notice: Subject to any disclaimer, the term of this patent is extended or adjusted under 35 U.S.C. 154(b) by 0 days.

(21) Appl. No.: 17/857,313

(22) Filed: Jul. 5, 2022

(65) Prior Publication Data

US 2023/0002141 A1     Jan. 5, 2023

Related U.S. Application Data

(60) Provisional application No. 63/217,930, filed on Jul. 2, 2021.

(51) Int. Cl.
    *B65D 81/38*        (2006.01)
    *A47G 23/02*       (2006.01)
    (Continued)

(52) U.S. Cl.
     CPC ...... *B65D 81/3886* (2013.01); *B29C 45/0053* (2013.01); *B29C 2045/0079* (2013.01);
    (Continued)

(58) Field of Classification Search
     CPC ............ B65D 81/3886; B65D 2203/12; B65D 81/3876; B29C 45/0053;
    (Continued)

(56) References Cited

U.S. PATENT DOCUMENTS

| | | | | |
|---|---|---|---|---|
| 2,107,981 A | * | 2/1938 | Ford | A47G 19/2227 |
| | | | | 215/398 |
| 2,485,142 A | * | 10/1949 | Duncan | A63H 5/00 |
| | | | | 222/386 |

(Continued)

FOREIGN PATENT DOCUMENTS

WO     2018085221 A1    5/2018

OTHER PUBLICATIONS

Koozie® Woody Can Kooler, #46257, Image Wear Solutions, https://www.imagewearsolutions.com/p/product/dff48b8d-fe75-45b0-bdd2-37e54bd62e3c/koozie-woody-can-kooler (Retrieved: Jun. 28, 2022) 4 pgs.

(Continued)

*Primary Examiner* — Gideon R Weinerth
(74) *Attorney, Agent, or Firm* — BEKIARES ELIEZER LLP

(57) ABSTRACT

The present disclosure relates to a durable beverage container insulator that may enhance the consumer's enjoyment of the beverage by a combination of visual and tactile enhancements to the beverage container. For example, the insulator may be composed of a transparent material that enables the consumer to see the label and type of beverage being consumed. The insulator may be sufficiently firm to ensure durability over multiple uses, and/or sufficiently pliable to enable users to deform the insulator and enjoy a "cushy" feeling while holding the insulator. In some embodiments, the insulator is configured to enhance ease and/or enjoyment of sliding a beverage container in and out of the insulator. For example, in some embodiments, an aperture disposed on a base of the beverage container may generate a whistling sound as the beverage container is inserted in and/or pulled out of the insulator.

20 Claims, 11 Drawing Sheets

(51) Int. Cl.
*B29C 45/00* (2006.01)
*B29K 21/00* (2006.01)
*B29K 75/00* (2006.01)
*B29L 23/00* (2006.01)

(52) U.S. Cl.
CPC .... *B29K 2021/003* (2013.01); *B29K 2075/00* (2013.01); *B29K 2995/0026* (2013.01); *B29L 2023/001* (2013.01); *B65D 81/3876* (2013.01)

(58) Field of Classification Search
CPC ...... B29C 2045/0079; B29K 2021/003; B29K 2075/00; B29K 2995/0026; B29L 2023/001; A47G 23/0216; A47G 23/0266; A47G 23/02; A47G 23/0283; A47G 19/2288; A47G 2023/0291; A47G 2019/2244; F25D 2331/805; F25D 2331/803; F25D 3/08; F25D 2303/0841
USPC .................. 220/739; 446/204–209, 213–216
See application file for complete search history.

(56) References Cited

U.S. PATENT DOCUMENTS

| | | | | | |
|---|---|---|---|---|---|
| 2,504,541 | A | * | 4/1950 | Lawson, Jr. | ....... A47G 19/2227 116/72 |
| 2,880,548 | A | * | 4/1959 | Marr | ........................ G10K 5/00 D10/119.1 |
| 3,129,528 | A | * | 4/1964 | Gausewitz | ............... A63H 5/00 215/385 |
| 3,941,237 | A | * | 3/1976 | MacGregor, Jr. | ......... B08B 9/28 211/74 |
| 4,263,734 | A | * | 4/1981 | Bradshaw | ............. B28B 11/001 156/303.1 |
| 4,510,665 | A | * | 4/1985 | Scheurer | ............ B65D 81/3879 156/218 |
| 4,534,391 | A | * | 8/1985 | Ventimiglia | ............. G09F 23/00 40/306 |
| 4,540,611 | A | * | 9/1985 | Henderson | ............. B65D 23/08 428/36.5 |
| 4,747,507 | A | * | 5/1988 | Fitzgerald | ............. A47G 23/02 220/739 |
| 4,813,558 | A | * | 3/1989 | Fujiyoshi | ........... B65D 81/3886 220/703 |
| 5,067,922 | A | * | 11/1991 | McMahon | ......... B65D 81/3886 446/61 |
| 5,397,261 | A | * | 3/1995 | Malewicki | ......... B65D 81/3886 473/589 |
| 5,467,891 | A | * | 11/1995 | Perry | ................. B65D 81/3886 220/739 |
| 5,749,136 | A | * | 5/1998 | Bodiford | ............ B65D 81/3876 29/467 |
| 6,158,612 | A | * | 12/2000 | Alpert | ................ B65D 81/3881 220/739 |
| 6,182,855 | B1 | * | 2/2001 | Alpert | ................ A47G 23/0216 220/738 |
| 7,410,075 | B2 | * | 8/2008 | Killoren | ............. B65D 81/3886 220/739 |
| 8,061,551 | B2 | | 11/2011 | Matlovich | |
| 9,266,643 | B2 | | 2/2016 | Marcus et al. | |
| 9,702,609 | B2 | | 7/2017 | Robb et al. | |
| D970,304 | S | * | 11/2022 | Guo | ........................... D7/624.2 |
| D982,392 | S | * | 4/2023 | Aneja | ......................... D7/624.2 |
| 2002/0195043 | A1 | * | 12/2002 | Stawski, Jr. | ......... B65D 51/248 446/216 |
| 2005/0178774 | A1 | * | 8/2005 | Howell | ................ B65D 51/248 446/77 |
| 2006/0169860 | A1 | | 8/2006 | Altheimer | |
| 2007/0090116 | A1 | | 4/2007 | Xue Bin | |
| 2010/0140211 | A1 | * | 6/2010 | Becotte | .................... G10K 5/00 215/386 |
| 2010/0331465 | A1 | * | 12/2010 | Zhao | ..................... C08L 53/025 524/505 |
| 2011/0139798 | A1 | | 6/2011 | Maguire | |
| 2018/0118443 | A1 | * | 5/2018 | Emery | ............... A47G 23/0241 |
| 2018/0242764 | A1 | | 8/2018 | Wynne | |
| 2019/0254450 | A1 | * | 8/2019 | Koizumi | ................ G10K 1/072 |
| 2020/0297136 | A1 | * | 9/2020 | Bécotte | ................. B65D 81/36 |
| 2021/0139226 | A1 | * | 5/2021 | Monaghan | ......... B65D 81/3881 |
| 2021/0145196 | A1 | * | 5/2021 | Moody | ............. B65D 81/3881 |
| 2022/0047103 | A1 | * | 2/2022 | Leimer | ................. F16B 17/008 |
| 2022/0135315 | A1 | * | 5/2022 | Hu | ........................ B65D 17/28 220/592.16 |
| 2022/0212856 | A1 | * | 7/2022 | Sweeney | ............ B65D 81/3876 |
| 2022/0322855 | A1 | * | 10/2022 | Conohan | ............ A47G 19/2272 |
| 2023/0002141 | A1 | * | 1/2023 | Ward | ........................ B29C 45/0053 |

OTHER PUBLICATIONS

Beer blizzard chills your beer as you drink it, Author: Christopher Snow adn Reviewed.com(WTSP), Published: Mar. 26, 2016, https://www.wtsp.com/article/life/food/beer/beer-blizzard-chills-your-beer-as-you-drink-it/103573993, 5 pgs.

How Do Yeti Tumblers Work to Keep Beverages Cold/Hot?, Hunting Waterfalls 2022, Ryan McLean, https://huntingwaterfalls.com/how-do-yeti-tumblers-work/, 13 pgs.

* cited by examiner

TRANSPARENT BEVERAGE CONTAINER INSULATOR

RELATED APPLICATION

This application claims the benefit of priority to U.S. Provisional Application No. 63/217,930 on filed Jul. 2, 2021, which is hereby incorporated by reference herein in its entirety.

It is intended that the above-referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to insulating housing, insulating materials, and insulating containers.

BACKGROUND

In some situations, insulating a container housing cold or hot liquid may be desired. For example, a canned beverage loses a substantial amount of its thermal properties minutes after removing the can from its place of storage and when being consumed. Thus, the conventional strategy is to insulate the beverage using a container insulator. However, conventional container insulators are opaque, obscuring any artwork and/or branding on the beverage container housed in the container insulator.

Additional problems with conventional container insulators result from the low-quality material the container insulator is made of and/or the container insulator not being fully sealed/surrounded around the entirety of the canned beverage, thereby preventing maximum desired insulation. For example, many container insulators are made from a cheap foam-like material and contain holes/gaps in order to be foldable. Further, these container insulators are easily damaged or destroyed. Thus, there is a need for improved beverage container insulators that can reliably and repeatably enhance, rather than detract, from the drinking experience.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Provided herein are various embodiments of a beverage container insulator. One example embodiment of a beverage container insulator may comprise an open cavity for receiving a beverage container therein, a transparent sidewall, and a base. The transparent sidewall may have a tapered container receiving edge opposite to a tapered base receiving edge. The base may have an edge configured to connect to the base receiving edge of the sidewall. The base may have an aperture formed therein, in communication with the open cavity and configured to create a whistling sound upon a change in fluid pressure passing through the aperture.

In some embodiments, the insulator further comprises one or more ribs formed on an inner surface of the sidewall and configured to facilitate sliding of the beverage container within the open cavity. The one or more ribs may comprise first and second ribs, extending vertically along the inner surface of the sidewall and opposite to one another.

In some embodiments, at least some portion of the sidewall is composed of a non-yellowing additive. In some embodiments, at least some portion of the sidewall is composed of a discoloration resistant additive. In some embodiments, the container receiving edge defines an opening diameter that is larger than a base diameter defined by the base receiving edge.

In some embodiments, the sidewall is substantially cylindrical. In some embodiments, the base is substantially circular.

In some embodiments, at least one of the sidewall and the base comprises a thermoplastic elastomer (TPE). In some embodiments, at least one of the sidewall and the base comprises a thermoplastic urethane (TPU). In some embodiments, at least one of the sidewall and the base comprises a thermosetting polymer. In some embodiments, at least one of the sidewall and the base comprises a thermoplastic elastomer (TPE).

In some embodiments, the beverage container is configured to be flush against an upper surface of the base and an inner surface of the sidewall when housed within the beverage container insulator.

Also disclosed herein are various embodiments of a method for manufacturing a beverage container insulator. One example method of manufacturing a beverage container insulator may comprise manufacturing a transparent sidewall of the insulator using injection molding, wherein the mold has a negative draft along at least a top portion thereof. The method may further comprise manufacturing a base of the insulator, wherein the base has at least one aperture formed therein.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
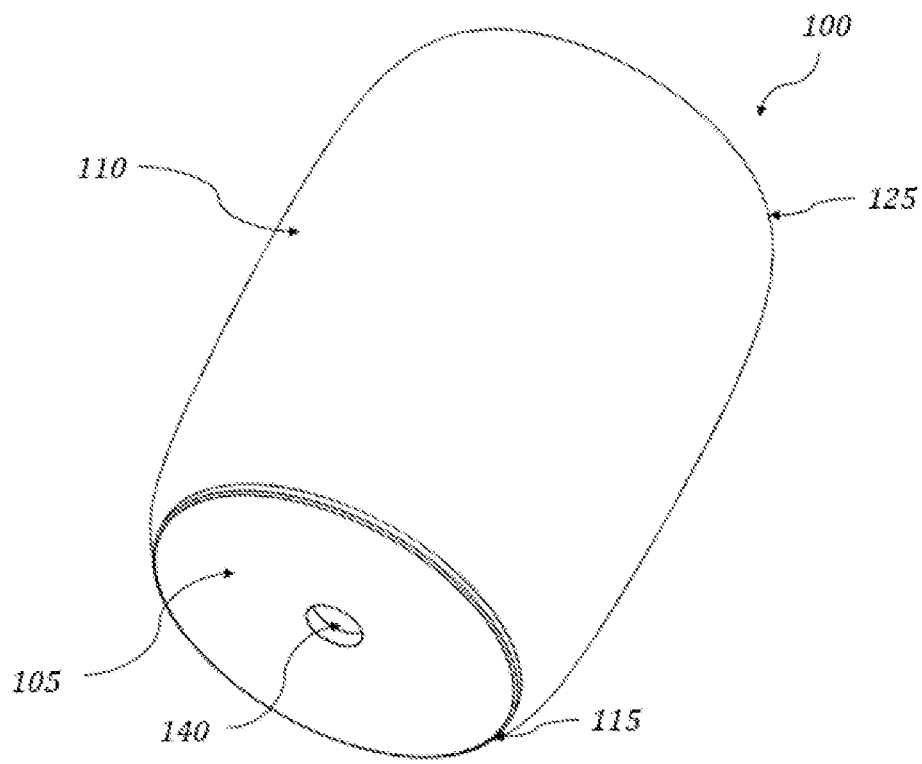
FIG. 1 is a perspective view of one embodiment of a beverage container insulator.
Figure 2:
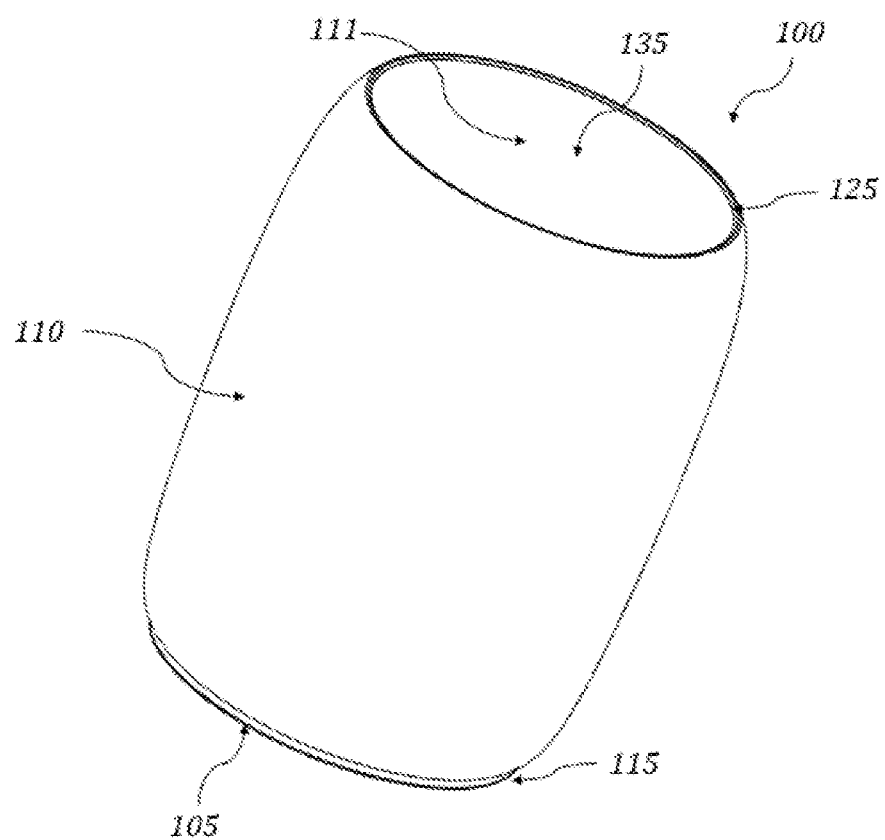
FIG. 2 is another perspective view of the beverage container insulator of FIG. 1.
Figure 3:
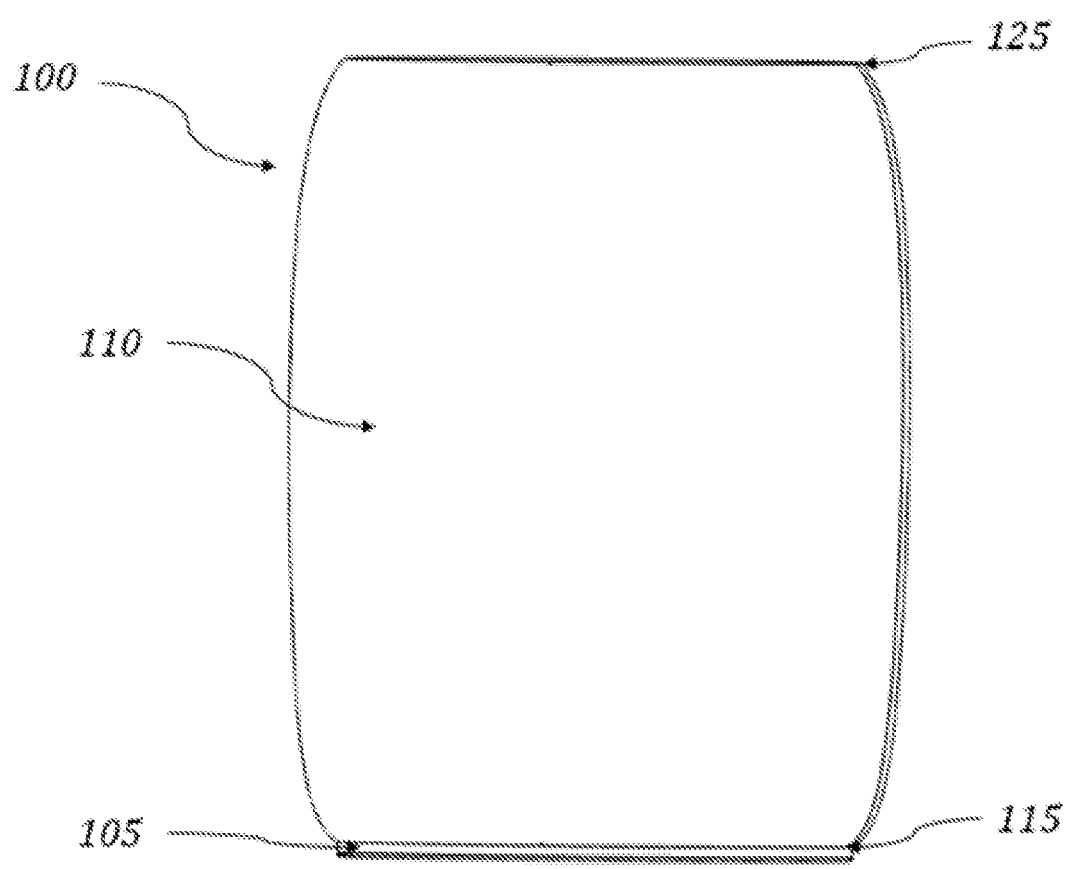
FIG. 3 is a side view of the beverage container insulator of FIG. 1.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification. Any and all publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an assembly" includes two or more assemblies. Each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the components to be used to manufacture the disclosed devices and articles of the disclosure as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

The present disclosure includes many aspects and features. Moreover, while many aspects and features relate to, and are described in, the context of insulating housing, insulating materials, and insulating containers, embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

Provided herein are various embodiments of a durable beverage container insulator that may enhance the consumer's enjoyment of the beverage by a combination of visual and tactile enhancements to the beverage container. For example, the insulator may be composed of a transparent material that enables the consumer to see the label and type of beverage being consumed. In some embodiments, the insulator optically enhances images and/or text on the beverage container housed therein. For example, a sidewall of the insulator may act as a lens, magnifying the beverage container. The insulator may be sufficiently firm to ensure durability over multiple uses, and/or sufficiently pliable to enable users to deform the insulator and enjoy a "cushy" feeling while holding the insulator. A top, receiving edge of the insulator may be tapered, further facilitating handling of the insulator. In some embodiments, the insulator is configured to enhance ease and/or enjoyment of sliding a beverage container in and out of the insulator. For example, in some embodiments, an aperture disposed on a base of the beverage container may generate a whistling sound as the beverage container is inserted in and/or pulled out of the insulator. In some embodiments, ribs formed along an inner sidewall of the insulator may facilitate sliding the beverage container in and out of the insulator.

To accomplish these and other objectives, the insulator may be manufactured using a variety of materials, e.g., Thermoplastic elastomer (TPE), Thermoplastic urethane (TPU), silicone, or the like. In some embodiments, the insulator is manufactured from a combination of materials. Where TPU is used, the TPU material may have discoloration resistant properties. In other embodiments, non-yellowing or other discoloration resistant additives may be included in the insulator to ensure transparency over time. In some embodiments, an inner surface of the insulator may include a lubricant to facilitate sliding of a beverage container in and out of the insulator, e.g., liquid silicone. At least some portion of the insulator (e.g., a bottom outside perimeter, an exterior side surface, etc.) may be configured to allow for the printing and/or adherence of messages and/or logos by third parties.

Details with regards to each component of the invention is provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Apparatus Configuration

The insulator may insulate by surrounding the beverage, similar to that of a conventional container insulator. Embodiments of the present disclosure provide an insulator comprised of a distributed set of components, including, but not limited to:

FIGS. 1-5 illustrates a housing 100 consistent with an embodiment of the present disclosure. In some embodiments, the housing 100 may comprise a base 105 and a sidewall 110 extending axially upwards from the base portion 105. Inner surfaces of the base 105 and the sidewall 110 may define an open cavity 135 for receiving a beverage container therein.

a. Sidewall

The sidewall 110 may be sufficiently transparent to enable a beverage consumer to clearly see a beverage container (not shown) housed within the housing 100. In some embodiments, the sidewall 110 may act as a lens to magnify one or more components of the beverage container housed therein.

The sidewall 110 may be any shape suitable for gripping within a consumer's hand. In the illustrated embodiment, the sidewall 110 is substantially cylindrically-shaped. In some embodiments, to further facilitate the consumer's tactile experience, at least one edge of the hollow cylinder defined by the sidewall 110 is tapered. For example, a container receiving edge 125, which defines an open rim of the housing 110 for inserting and removing a beverage container, may be tapered. In addition or alternatively, a base receiving edge 115 opposite to the container receiving edge 125 may be tapered. Where both the container receiving edge 125 and the base receiving edge 115 are tapered, as in the illustrated embodiment, the insulator 100 is substantially devoid of any sharp edges to ensure the consumer's comfort while handling the insulator 100.

The sidewall 110 may have one or more features thereon configured to assist with sliding the beverage container in and out of the cavity 135. For example, in some embodiments, a first diameter defined by the receiving edge 125 may be larger than a second diameter formed by the base receiving edge 115. A difference between the first and second diameters may be in a range of about 0.1 to 1 mm.

In some embodiments, the sidewall 110 may be sufficiently pliable such that opposing portions of an inner sidewall surface 111 come into contact with one another when a consumer squeezes the housing 100 in their hand. This "cushy" feeling may enhance the consumer's tactile experience while holding the insulator 100, and/or may facilitate storage of the insulator 100 when not in use.

Dimensions of the sidewall 111 may vary according to a size of the beverage container to be housed therein and/or to meet insulation requirements. For example, the sidewall 111 may be sufficiently wide to ensure sufficient insulation and/or comfort while gripping the housing 100. By way of non-limiting example, a thickness of the sidewall 111 may be in a range of about 0.2 to 1 inch. A height of the sidewall 111, measured along a longitudinal axis of the housing 100, may be in a range of about 3 to 10 inches. In some embodiments, the height of the sidewall corresponds to a standard sized beer can, e.g., a 12 ounce beer can, a 16 ounce beer can, etc.

b. Base

The base 105 may connect to the sidewall 110 along an external perimeter of the base 105. In particular, the edge of the base 105 may connect to the base receiving edge 125 of the sidewall 110 during manufacturing. The base 105 may be composed of a same or similar material to the sidewall 110. In some embodiments, the base 105 is composed of a more firm material than the sidewall. In other embodiments, the sidewall 110 and the base 105 are integrally formed of the same material. Like the sidewall 110, the base 105 may be transparent.

In some embodiments, the base 105 may comprise an aperture 140 that is in open communication with the cavity 135 defined within the housing 100. The aperture 140 may be used as a means to disfavor suction and/or a sealing ability of the beverage container while received and/or housed in the housing 100. The aperture 140 may, in some instances, allow for an audible sound to be created during the receiving and/or removal of a liquid holding container into and/or from the housing 100. The audible sound may occur via varying air and/or fluid pressure and/or air and/or fluid being inserted and/or expelled from the space between the liquid holding container and the housing 100. One nonlimiting example of an audible sound is a whistling noise. While the aperture 140 is disposed on a center of the base 105 in the illustrated embodiment, it will be appreciated that the aperture can be disposed anywhere on the base 105.

In some embodiments, the aperture 140 may be embodied as, for example, a whistle. In some embodiments, the base 105 comprises a plurality of apertures.

c. Cavity

Figure 4:
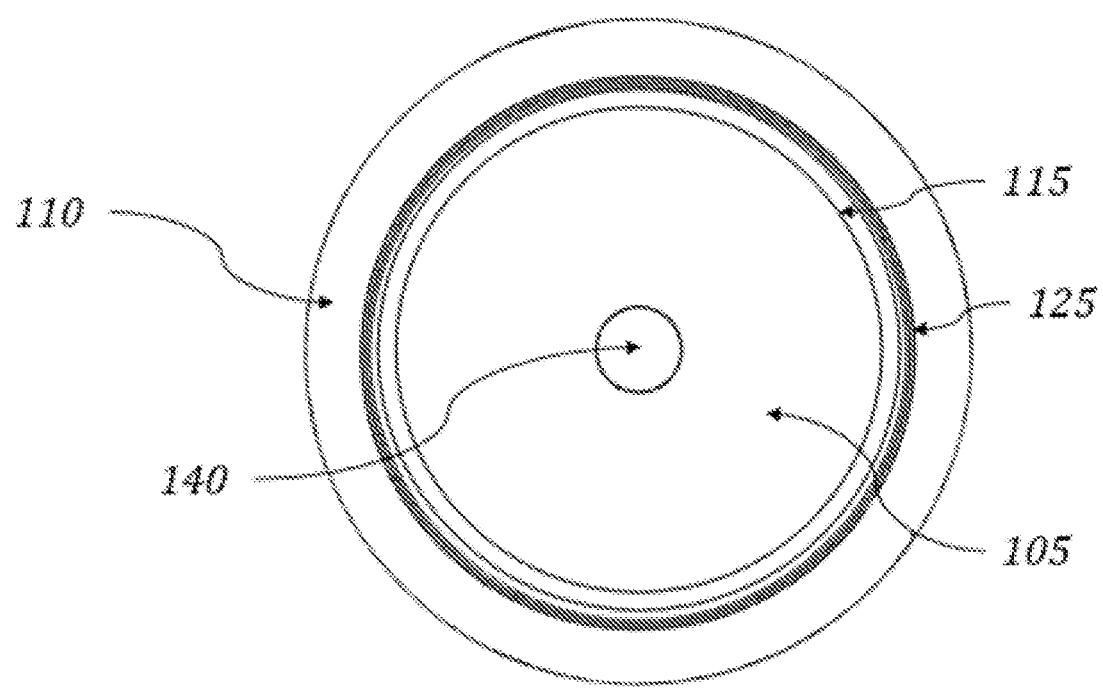
FIG. 4 is a top view of the beverage container insulator of FIG. 1.
Figure 5:
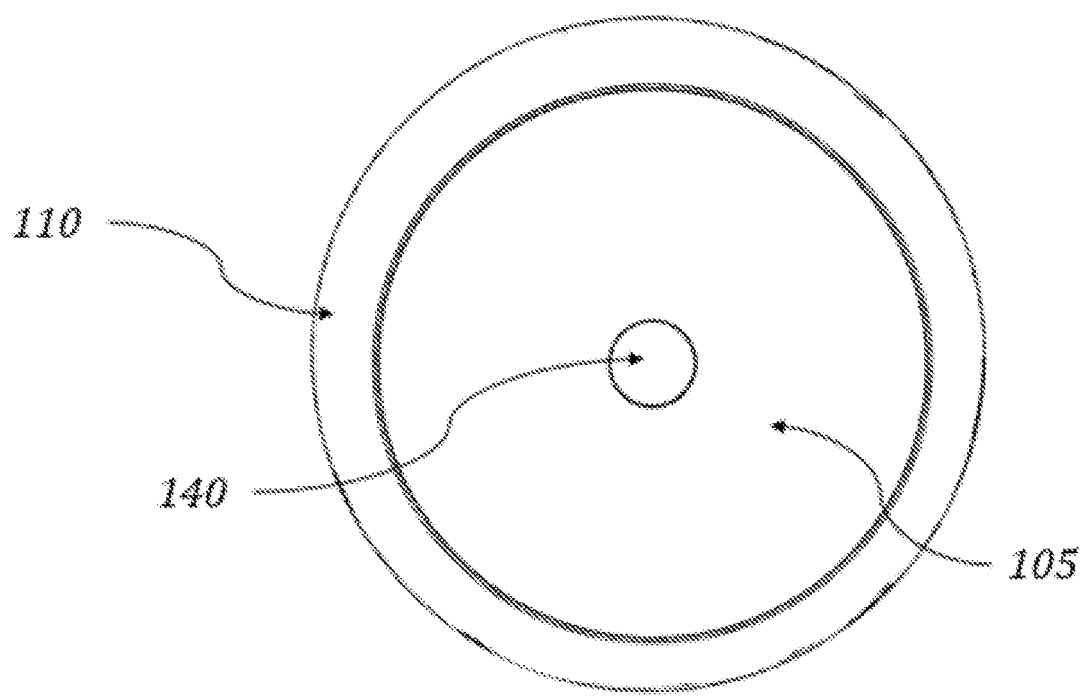
FIG. 5 is a bottom view of the beverage container insulator of FIG. 2.
Figure 6:
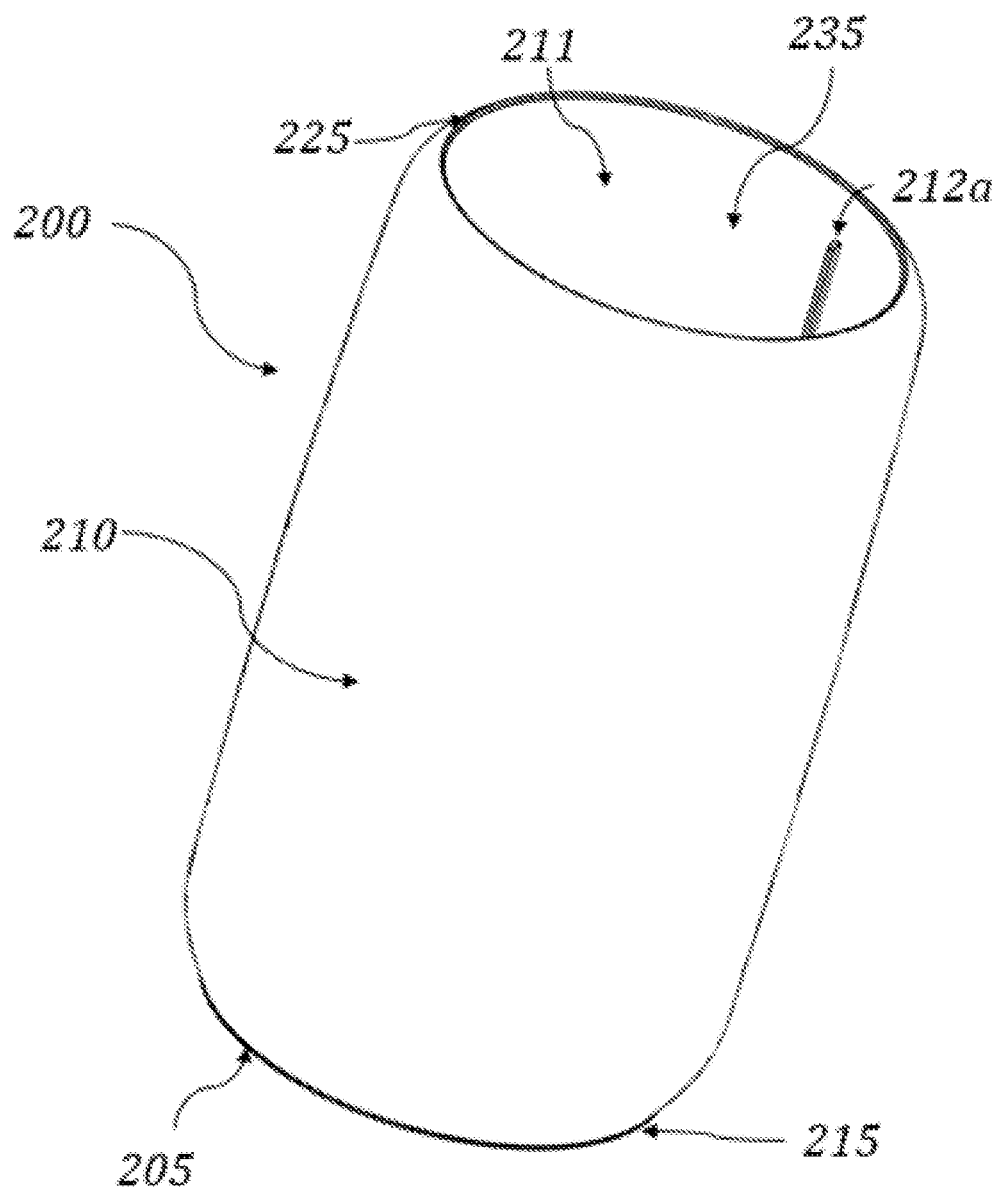
FIG. 6 is a perspective view of another embodiment of a beverage container insulator.
Figure 7:
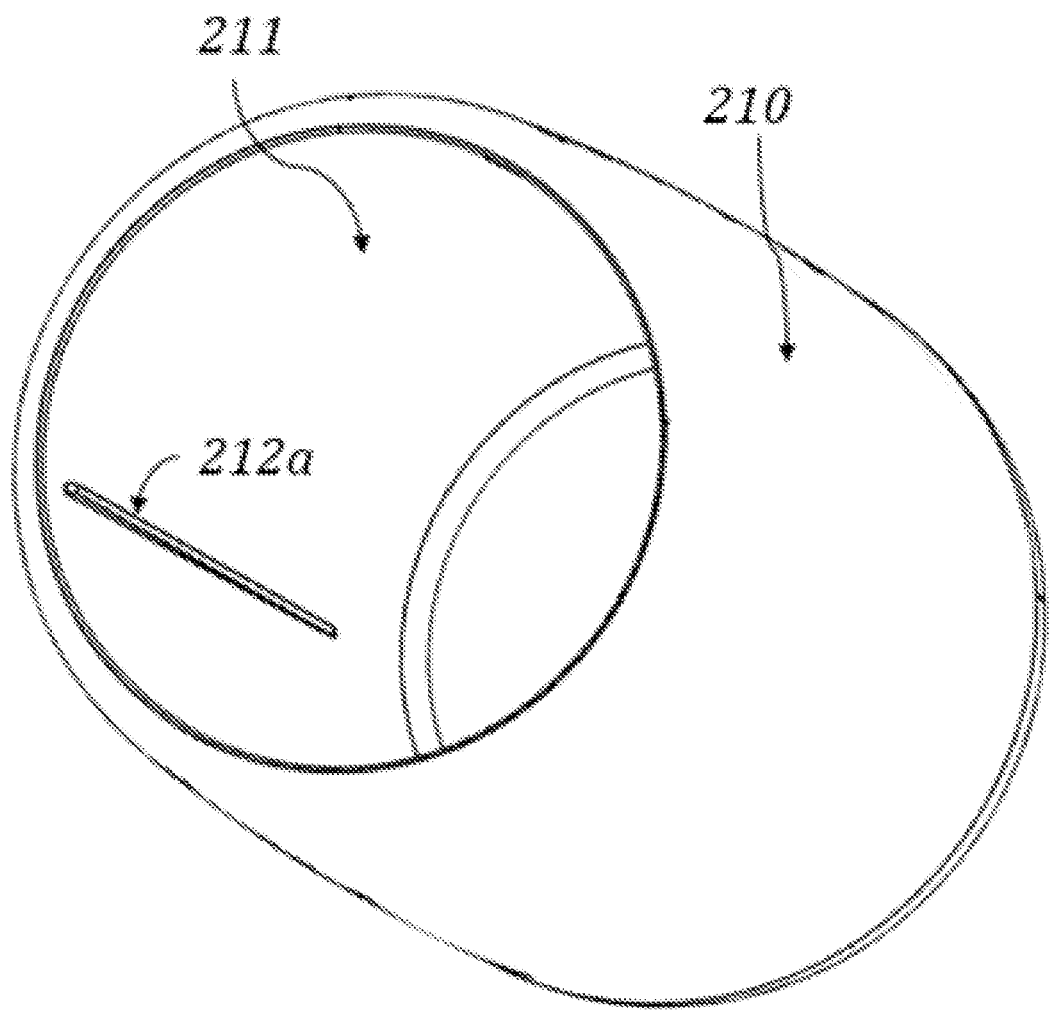
FIG. 7 is another perspective view of the beverage container insulator of FIG. 6.
Figure 8:
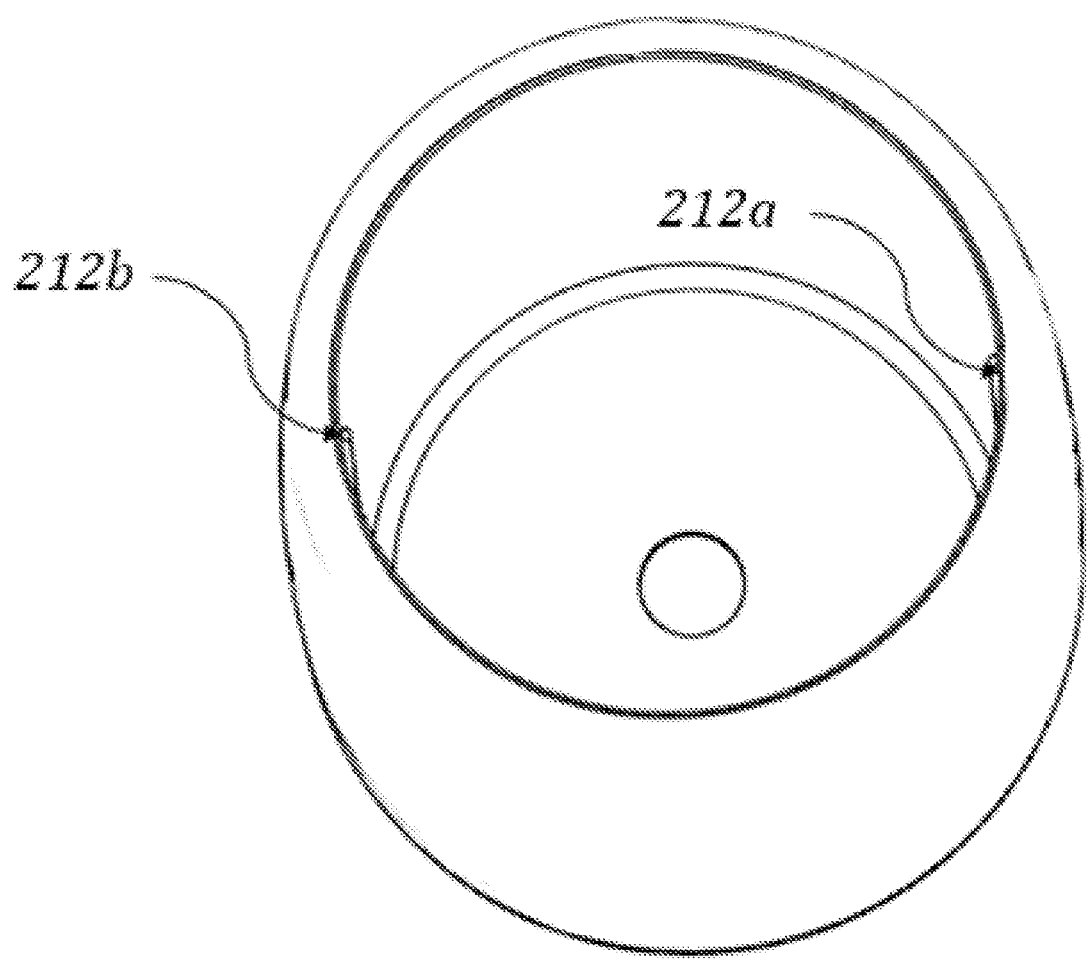
FIG. 8 is another perspective view of the beverage container insulator of FIG. 6.
Figure 9:
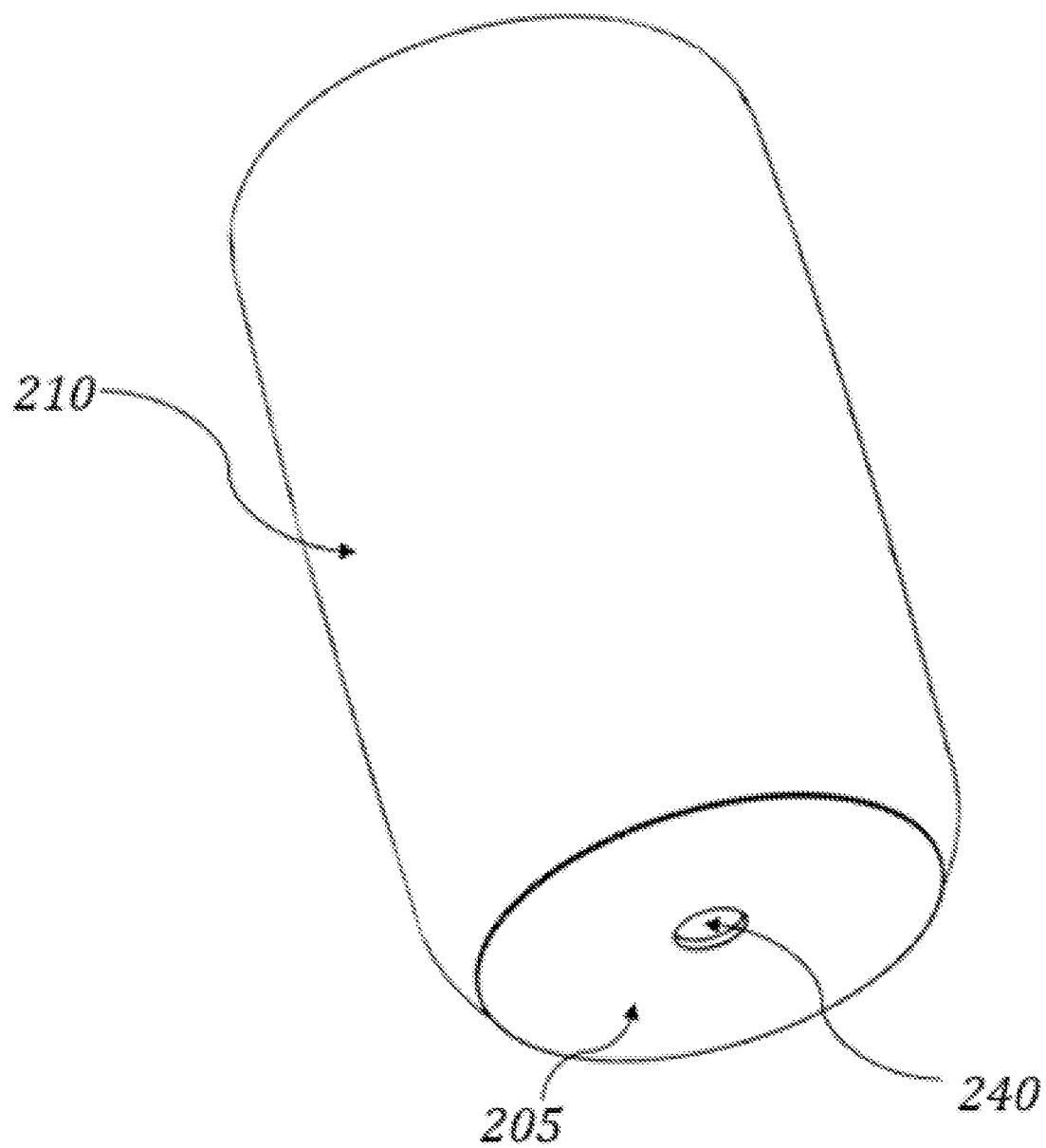
FIG. 9 is another perspective view of the beverage container insulator of FIG. 6.
Figure 10:
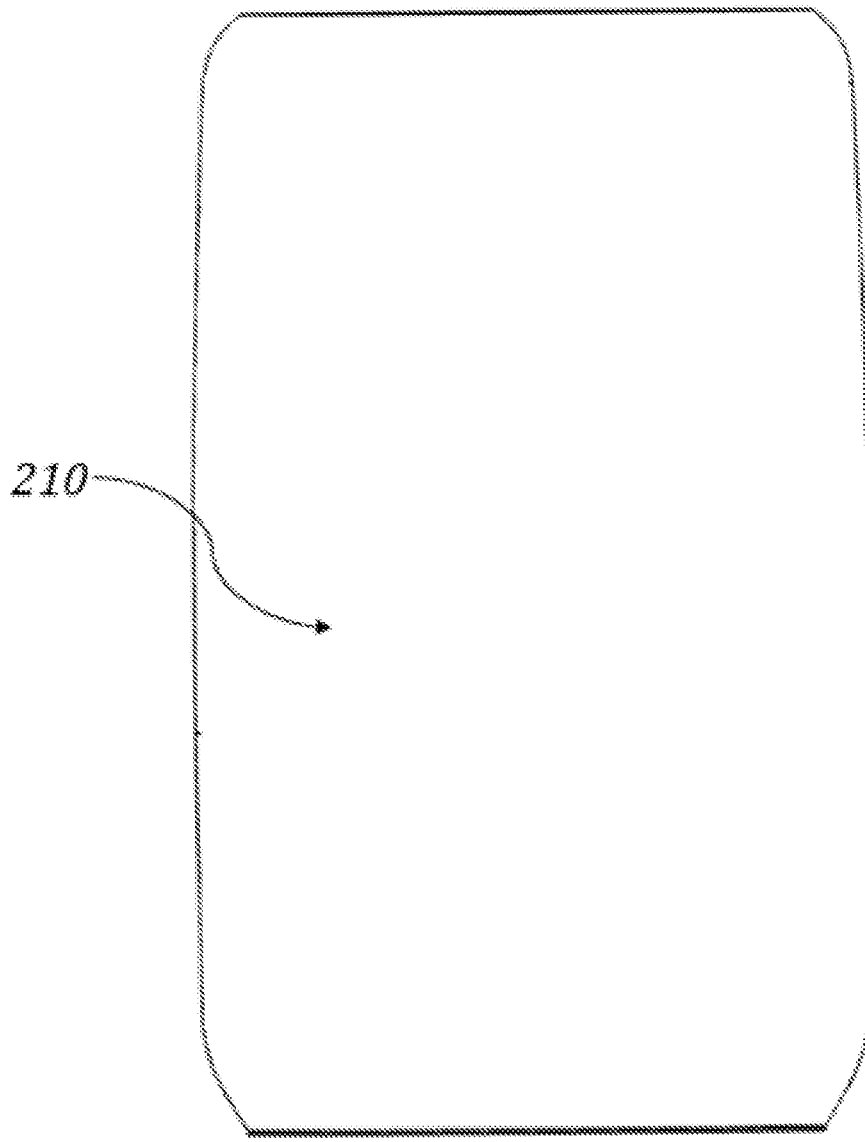
FIG. 10 is a side view of the beverage container insulator of FIG. 6.

The cavity 135 defined by inner walls of the housing 100 may be configured for removably housing a container therein. As illustrated in FIG. 4, in some embodiments, container may be configured to be flush against the inner surface 111 of the sidewall 110 and the inner wall of the base 105.

The cavity 135 To facilitate sliding of the container in and out of the cavity 135, in some embodiments at least the inner surface 111 of the sidewall 110 is lined with a lubricant, e.g., liquid silicone. It will be appreciated that the aperture 140 defined in the base 105 may further facilitate insertion and removal of the container by limiting suction properties of the housing 100 and/or preventing the formation of a vacuum.

In some embodiments, at least a portion of insulator 100 may be transparent, translucent, and/or opaque. In further embodiments, insulator 100 may allow for the liquid holding container housed in insulator 100 to be visible through the internal housing and the external housing. In still further embodiments, the insulator 100 may allow for objects on one side of apparatus to be visible from the opposite side viewing through the insulator 100. By way of nonlimiting example, the insulator 100 may be transparent enough as to be "water clear." In yet further embodiments, the insulator 100 may be made from, from example, at least one of the following materials:
 a thermosetting polymer,
 a thermoplastic urethane (TPU),
 a thermoplastic elastomer (TPE),
 an adhesive,
 a fibrous material,
 any type of metal and/or metal alloy,
 silicone,
 Polyvinyl chloride (PVC)
 a material with discoloration resistant properties, and
 any other insulating material and/or combination thereof.

In some embodiments, the insulator is comprised of one or more independent housings having spaces therebetween that can facilitate the insulative properties of the insulator 100. For example, in some embodiments, the insulator comprises internal and external housings that may be substantially the same shape. The internal and external housings may be connected to one another along one or more of their respective container receiving edges and/or their base receiving edges. A space formed between the internal housing and the external housing may comprise a vacuum and/or an absence of gas or fluid. In further embodiments, the space may be configured to house at least one of the following:
 air,
 argon,
 krypton,
 nitrogen,
 any combination thereof.

In embodiments having internal and external housings, both housings may be substantially similar in shape. In some embodiments, at least a portion of the insulator may, for example, be shaped as at least one of the following:
 a frustoconical shaped cross-section,
 a frustopyramidal shaped cross-section,
 a frustocylindrical shaped cross-section,
 a box shaped cross-section,
 a frustopolyhedrical shaped cross-section,
 an asymmetrical frustopolyhedrical shaped cross-section,
 asymmetrical frustooctagonal-pyramidal shaped cross-section, and
 any combination thereof.

In some embodiments, at least a portion of the base 105 may, for example, be shaped as at least one of the following:
 a circle,
 a square,
 a rectangle,
 an ellipse,
 a rhombus,
 a pentagon,
 a hexagon,
 an organic shape, and
 any combination thereof.

An alternative embodiment of a beverage container insulator 200 is illustrated in FIGS. 6-10. The insulator 200 may be configured similarly to the insulator 100, with some notable differences. For example, a height of the insulator 200 may be larger than a height of the insulator 100, to accommodate a taller beverage container. In some embodiments, the heights of the insulators 100, 200 correspond to standard sizes of beer cans, e.g., 12 oz and 16 oz respectively.

Like insulator 100, insulator 200 may have one or more features to assist with sliding of the beverage container. For example, one or more ribs 212 formed on the inner surface 211 of the sidewall 210 may facilitate sliding of a beverage container in and out of the cavity 235. In the illustrated embodiment, two ribs 212a, 212b comprise elongate protrusions extending vertically along the inner surface of the sidewall 210. The number and positioning of the ribs may vary, although in the illustrated embodiment the ribs 212a, 212b are disposed on opposing portions of the inner sidewall 211. In other embodiments, one or more ribs may be spaced apart at regular intervals around the entire inner perimeter of the sidewall 211.

III. Apparatus Use

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 11:
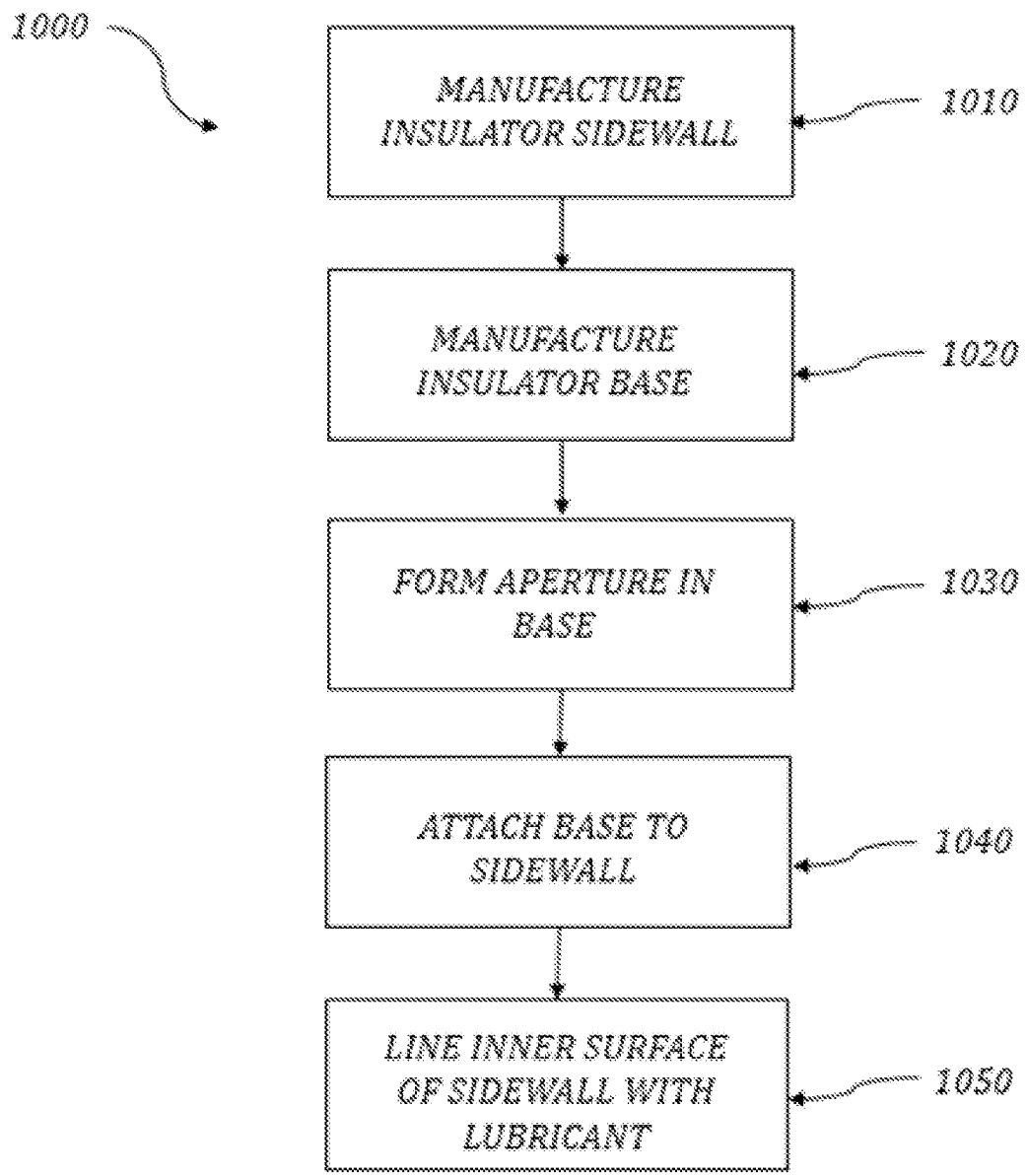
FIG. 11 is flowchart illustrating a method of manufacture of a beverage container insulator.

Consistent with embodiments of the present disclosure, a method may be performed by at least one of the aforementioned components. The method may be embodied as, for example, but not limited to, computer instructions, which when executed, perform the method. An example method 1000 of manufacturing a beverage container insulator is illustrated in FIG. 11.

A first step 1010 of the method may involve the manufacture of a sidewall of the beverage container insulator. In some embodiments, the sidewall is manufactured using injection molding, where the material or combination of materials that comprise the beverage container insulator are injected in liquid or semi-liquid form into a mold. In such embodiments, the mold may have a shape corresponding to a shape of the beverage container insulator; specifically, the mold shape may involve a negative draft along at least a top of edge of the beverage container insulator. A second step 1020, which may be performed before, after, or simultaneously with the first step, involves the manufacture of the base of the insulator. The base may be manufactured using injection molding or other appropriate process. In some embodiments, a third step 1030 involves cutting out an aperture in the base. However, it will be appreciated that the aperture may also be formed during step 1020, e.g., using the mold.

A fourth step 1040 may involve permanently attaching the sidewall to the base along a base receiving edge of the sidewall. In other embodiments, the sidewall and the base of the beverage container insulator are one integral piece, formed at the same time via, e.g., injection molding. A final, fifth step 1050 may involve coating of at least an inner surface of the sidewall with a lubricant, e.g., liquid silicone, to assist with sliding of the beverage container in and out of the insulator.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. Approximately 3.5" tall, interior diameter approximately 2", circumference approximately 10", sidewall thickness approximately 0.25", base thickness approximately 0.25".

Aspect 2. Approximately 5.9" tall, interior diameter approximately 2", circumference approximately 10", sidewall thickness approximately 0.25", base thickness approximately 0.25".

Aspect 3. The "see-it cooler" may be manufactured using a combination of TPE, TPU and/or silicone.

Aspect 4. The "see-it cooler" may have temperature insulating qualities. These qualities may be achieved by the material of the cooler itself, and/or by a small air space between two layers of the TPU/silicon sidewall. Also the outside bottom of the product may be able to be printed on or have qualities where a message or logo can be adhered/applied permanently by an outside vendor.

Aspect 5. The "see-it cooler" is beverage can/bottle holder that will enable the consumer to see the label and type of beverage being consumed. It may have the insulating performance of an average foam container insulator. It may be firm yet pliable, e.g., similar to a clear cell phone protective case. The TPU material or other material included in the "see-it cooler" may have discoloring resistant properties. In some aspects, the bottom 0.50" outside perimeter of the "see-it cooler" is a place where messages and or logos may be permanently printed or adhered by third parties.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A beverage container insulator comprising:
   an open cavity for receiving a beverage container therein;
   a transparent sidewall having a tapered container receiving edge opposite to a tapered base receiving edge; and
   a base having
      an edge configured to connect to the base receiving edge, and
      an aperture formed therein, in communication with the open cavity;
   wherein the transparent sidewall is comprised entirely of a thermoplastic elastomer material and further includes a lubricant lining on an interior of the transparent sidewall to ease insertion of a beverage container.

2. The beverage container insulator of claim 1, further comprising one or more ribs formed on an inner surface of the sidewall and configured to facilitate sliding of the beverage container within the open cavity.

3. The beverage container insulator of claim 2, wherein the one or more ribs comprise first and second ribs, extending vertically along the inner surface of the sidewall and opposite to one another.

4. The beverage container insulator of claim 3, wherein at least some portion of the sidewall is composed of a discoloration resistant additive.

5. The beverage container insulator of claim 1, wherein at least some portion of the sidewall is composed of a non-yellowing additive.

6. The beverage container insulator of claim 1, wherein the container receiving edge defines an opening diameter that is larger than a base diameter defined by the base receiving edge.

7. The beverage container insulator of claim 1, wherein the sidewall is substantially cylindrical.

8. The beverage container insulator of claim 1, wherein the base is substantially circular.

9. The beverage container insulator of claim 1, wherein the base comprises a thermoplastic elastomer (TPE).

10. The beverage container insulator of claim 1, wherein at least one of the sidewall and the base comprises a thermoplastic urethane (TPU).

11. The beverage container insulator of claim 1, wherein at least one of the sidewall and the base comprises a thermosetting polymer.

12. The beverage container insulator of claim 1, wherein the beverage container insulator may produce a sound upon a change in fluid pressure forcing air through the aperture.

13. The beverage container insulator of claim 1, wherein the beverage container insulator is configured such that a container housed within the beverage container insulator is flush against an upper surface of the base and an inner surface of the sidewall.

14. A method of manufacturing a beverage container insulator, comprising:
   manufacturing a transparent sidewall of the insulator using injection molding, wherein the mold has a negative draft along at least a top portion thereof;
   manufacturing a base of the insulator, wherein the base has at least one aperture formed therein; and
   permanently attaching the sidewall to the base along a base receiving edge of the sidewall,
   wherein the transparent sidewall is entirely of a thermoplastic elastomer material and further includes a lubricant lining on an interior of the transparent sidewall to ease insertion of a beverage container.

15. The method of claim 14, wherein the beverage container insulator may produce a sound upon a change in fluid pressure forcing air through the aperture.

16. The method of claim 14, wherein the lubricant is liquid silicone.

17. The method of claim 14, wherein at least one of the sidewall and the base comprises a thermosetting polymer.

18. The method of claim 14, wherein the sidewall is tapered along both the base receiving edge and a container receiving edge, opposite to the base receiving edge.

19. The method of claim 14, wherein the sidewall is substantially cylindrical.

20. The method of claim 14, wherein the base is substantially circular.

* * * * *